May 12, 1970     M. HOSSMANN     3,511,568
ELECTRO-OPTICAL DISTANCE MEASURING DEVICE
Filed Oct. 25, 1966
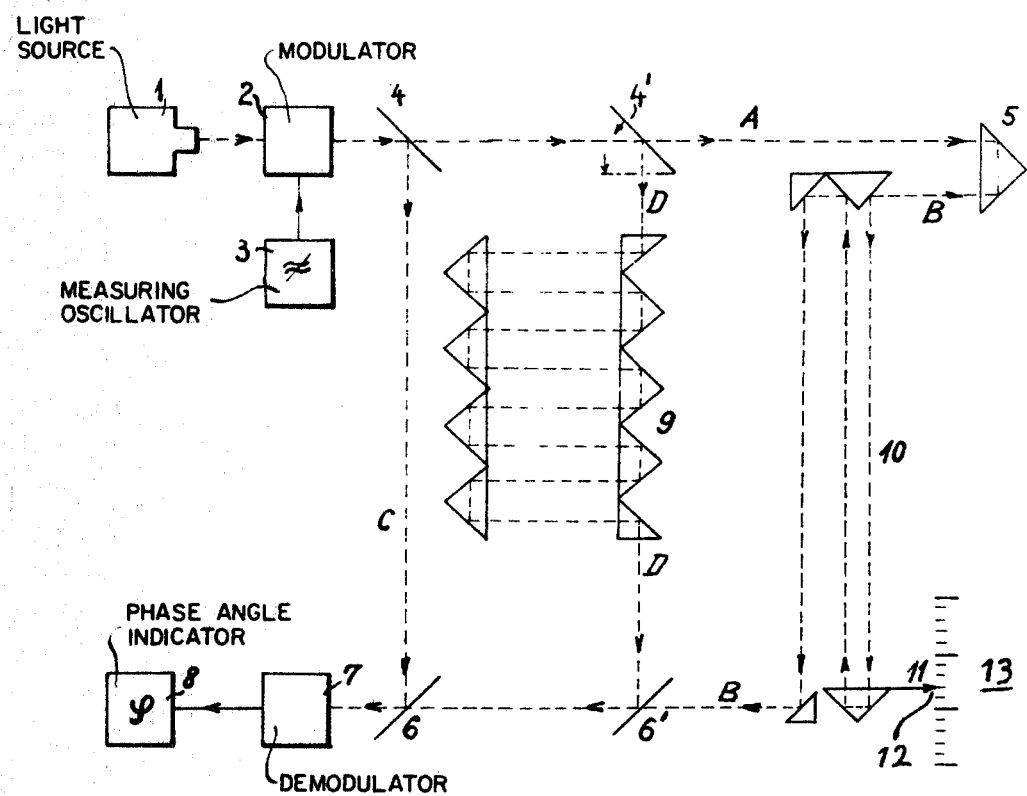
INVENTOR
MARCEL HOSSMANN

United States Patent Office 3,511,568
Patented May 12, 1970

3,511,568
ELECTRO-OPTICAL DISTANCE MEASURING DEVICE
Marcel Hossmann, Zurich, Switzerland, assignor to Albiswerk Zurich A.G., Zurich, Switzerland
Filed Oct. 25, 1966, Ser. No. 589,396
Claims priority, application Switzerland, Nov. 25, 1965, 16,264/65
Int. Cl. G01c 3/08
U.S. Cl. 356—5               5 Claims

ABSTRACT OF THE DISCLOSURE

An electro-optical distance measuring device comprises a transmitter, including a light source and a modulator, located at one end of the distance to be measured and transmitting modulated light to the other end of the distance where a light reflector returns the modulated light to a receiver at the one end of the distance. The receiver includes a demodulator and a phase angle indicator. An adjustable light loop, including an indicator and a scale, is positioned in the path of light of the reflected light in advance of the receiver, and a fixed length light loop is positioned in the ambient atmosphere. Means are operable to shunt the emitted modulated light away from the measuring path and through the fixed length light loop to the receiver. A variable frequency oscillator is connected to the modulator to tune the wave length of the modulation to the length of the fixed length light loop.

SUMMARY OF THE INVENTION

This invention relates to electro-optical distance measurement, and, more particularly, to a novel and improved electro-optical distance measuring device including a transmitter for emitting modulated light, a receiver for receiving the modulated light after reflection from an object located at the remote end of the measured distance, interval or path, and means for measuring the phase difference between the modulation of the emitted light and the modulation of the received light.

Known distance measuring methods are based on measuring the time $\Delta t$ required for a signal to travel double the measured distance. The calculation of the distance D is effected utilizing the time-path equation $2D = c\Delta t$. This presupposes exact knowledge of the speed of propagation $c$ of a carrier wave in the medium or, respectively, in the atmosphere. The computation of the actual speed of propagation $c_0$ from the universal speed of light in a vacuum may be derived from the following equation:

$$c = \frac{c_0}{\sqrt{\epsilon \mu}} \qquad (1)$$

In this equation, $\epsilon$ is the dielectric constant of the atmosphere and $\mu$ is the permeability constant of the atmosphere.

For waves in the light spectrum, the expression $\sqrt{\epsilon \mu}$ is equal to the index of diffraction $n$ of air. Under these circumstances, Equation 1 is transformed as follows:

$$c = \frac{c_0}{n} \qquad (2)$$

The speed of propagation of light waves in the atmosphere is frequency-dependent (dispersion effect). Additionally, the wave used is not a mathematical single oscillation but always consists of a band of frequencies. The velocity of propagation is therefore always equal to the group velocity of the frequency band or group.

Determination of the group velocity $c_{Gr}$ requires knowledge of the group index of refraction $n_{Gr}$. Equation 2 may thus be transformed as follows:

$$c_{Gr} = \frac{c_0}{n_{Gr}} \qquad (3)$$

The group index of refraction $n_{Gr}$ for normal conditions of light waves may be calculated from Edlin's equation, as follows:

$$(n_{Gr} - 1)10^7 = 2875.69 + 3\frac{16.206}{\lambda^2} + 5\frac{0.139}{\lambda^4} \qquad (4)$$

The normal conditions of Edlin's formula may be converted to the prevailing atmospheric conditions by the following equation:

$$n_L = 1 + \frac{n_{Gr} - 1}{1 + \alpha t} \cdot \frac{P}{760} - \frac{5.5 \cdot 10^{-8}}{1 + \alpha t} e \qquad (5)$$

In the above equations $n_c$ is the index of refraction under actual conditions, $t$ is the air temperature in degrees C., $p$ is the air pressure in mm. Hg, $\alpha$ is the coefficient of expansion of the gases and equals 0.003661, and $e$ is the partial pressure of water vapor in mm. Hg.

Using Equation 5 as applied, by way of example, to a light wave having the wave length $\lambda$ equals 0.56 $\mu$m. (yellow-green light), the following conditions obtain:

With $\Delta t = \pm 1°$ C. with $t$ being between 0° C. and 20° C., $p$ being between 760 mm. Hg and 680 mm. Hg, and $e$ being between 0 mm. Hg and 10 mm. Hg, the average value of $n_L(t)$ may be expressed as follows:

$$n_L(t) \sim \pm 1 \cdot 10^{-6} \qquad (A)$$

With $\Delta p = \pm 1$ mm. Hg, when $t$ is between 0° C. and 20° C., then:

$$\Delta n_L(t) \sim \pm 0.4 \cdot 10^{-6} \qquad (B)$$

With $\Delta e = \pm 1$ mm. Hg, with $t$ lying between 0° C. and 20° C., there results:

$$\Delta n_L(t) \sim \pm 5.3 \cdot 10^{-8} \qquad (C)$$

A comparison of these influences indicates that the influences of temperature variations and pressure variations are of the same order of magnitude, while the influence of the atmospheric moisture is much smaller. In known distance meters based on electro-optics, this fact has been taken into account in that the electric oscillation frequency required for modulation of the light wave (effective measuring wave) is controlled by a cavity resonator filled with dry air, the pressure and the temperature being able to adapt themselves to the environmental influences. However, as has been stated above with reference to Equation 3, the group velocity rather than the velocities of the individual components is decisive for the actual index of refraction.

For comparison purposes, the calculation of the modulation frequency per se, preferably in the microwave range, may be derived using the equation according to Essen and Froome, as follows:

$$n_M = \left(1 + \frac{103.49}{T}\right)(p - e) + \frac{86.27}{T}\left(1 + \frac{5748}{T}e\right)10^{-6} \qquad (6)$$

In this equation, T is the absolute temperature in degrees K., and $p$ and $e$ are in mm. For the same variations in temperature, pressure and moisture, there are obtained:

$$\Delta n_M(t) \sim \pm 1.4 \cdot 10^{-6}$$
$$\Delta n_M(p) \sim \pm 0.4 \cdot 10^{-6}$$
$$\Delta n_M(e) \sim \pm 6.2 \cdot 10^{-6} \qquad (D)$$

In comparison with the values for light waves, it can be seen, from the three equations above, that the values as a function of temperature and pressure are of the same order of magnitude but, for microwaves, the influence of the atmospheric moisture predominates.

In previously proposed measuring arrangements, the wave length of the modulation wave is adapted to meteorological conditions. For the distance measurement itself, this modulation wave is used to modulate a carrier wave, whereby it is influenced according to the group or band velocity. If this carrier wave is a light wave, its group or band velocity is influenced according to Equation 4, while the velocity of the modulated wave is corrected according to Equation 6. The modulation thus undergoes an influence of the same order of magnitude as in the resonator. To eliminate these influences, an exact determination of the frequencies must be made, and the meteorological influences must be completely eliminated.

An object of the present invention is to provide an electro-optical distance measuring device by means of which meteorological influences are compensated directly and an exact knowledge of the frequencies is not necessary.

Another object of the invention is to provide such a device including a light loop having a fixed length and selectively connectable in place of the measuring path.

A further object of the invention is to provide such a device including a light loop of a fixed length connectable in place of the measuring path and positioned in the ambient air.

Still another object of the invention is to provide an electro-optical distance measuring device including a fixed length light loop which may be switched into the place of the measuring path and further including a variable frequency oscillator for tuning the wave length of the modulation to the length of the light loop.

A further object of the invention is to provide an electro-optical distance measuring device which is simple in construction, efficient in operation and simple to manipulate.

For an understanding of the principles of the invention, reference is made to the following description of a typical embodiment thereof as illustrated in the accompanying drawing.

In the drawing, the single figure is a diagrammatic illustration of an electro-optical distance measuring device embodying the invention.

Referring to the drawing, the device comprises a transmitter including a light source 1, a modulator 2 and a measuring oscillator 3 whose frequency of oscillation is adjustable. The device further includes a receiver which comprises a demodulator 7 and a phase indicator or comparator 8.

The output of the transmitter is directed through a ray divider device 4, 4′, and the input to the receiver is directed through a ray divider device 6, 6′. Ray divider device 4, 4′ includes a first partial deflector 4, which may be, for example, a light permeable mirror, and a second light deflector 4′ which is adjustable between two positions, one indicated in solid lines in the drawing and the other indicated in dotted lines in the drawing.

The ray divider 6, 6′ includes a pair of ray deflectors 6 and 6′, the deflector 6 being associated with the deflector 4 and the deflector 6′ being associated with the deflector 4′. Both deflectors 6 and 6′ may be light permeable mirrors, for example. By means of the ray dividers, either the rays A and C or the rays C and D may be selectively transmitted and, correspondingly, either the rays B and C or the rays C and D received by the receiver.

At the remote end of the distance to be measured, a reflecting device 5, such as a mirror or a prism, is set up. In order to measure the phase difference between the emitted ray C and the received ray B, there is provided an adjustable light loop 10 with a means or device 11 for determining or indicating the adjustment.

Ray D is directed over a second light loop 9 which has a fixed loop length and which is positioned in the ambient air. The ray D thus travels from mirror 4′ through fixed length light loop 9 to mirror 6′. This occurs when mirror 4′ has the position indicated in solid lines in the drawing. When mirror 4′ is in the dotted line position, the ray D is not transmitted but the ray A is transmitted to reflector device 5 from which it emerges as the ray B which is directed through the adjustable light loop 10.

Measurement of the distance between the transmitter 1 and the reflecting device 5 is effected in a known manner. Thus, a light ray from light source 1 is modulated in modulator 2 with an oscillation from oscillator 3 and is radiated as the ray A. At the remote end of the distance to be measured, ray A is reflected by the device 5 and continues as ray B through the adjustable light loop 10 to the demodulator 7, which it enters with the ray C directed to demodulator 7 by mirrors 4 and 6. The two rays entering the demodulator produce, due to the resulting interference in the phase indicator 8, a signal which is dependent upon the phase difference between the rays B and C. By variation of the adjustable light loop 10, the signal in phase indicator 8 may be changed.

Taking this into consideration, if, prior to the measurement, a calibration measurement using a known distance, preferably the distance O, is made, then the displacement of the adjustable light loop 10 is a measure of the measured distance. This distance can be determined with the device 11 which principally comprises a pointer 12 cooperating with a scale 13. However, the indicated measured distance is falsified by meteorological conditions and must be adjusted by corrections derived in accordance with the formulae mentioned above in the introduction.

With the invention device, a calibration can be effected with a fixed distance. By setting ray dividers 4–4′ and 6–6′ so that rays C and D enter demodulator 7, there is a resulting interference which causes a signal in phase indicator 8. If, subsequently, the oscillation frequency of oscillator 3 is varied until the interference provides a zero signal, for example, the wave length of the modulation, referred to the group velocity of the modulated ray path, is tuned to the length of the fixed light loop 9. Naturally, the path of ray C between the two ray dividers 4 and 6 must be taken into consideration in that, for example, the length of this path is considered in the light loop 9.

If the distance is measured following such a calibration, the practical determinant as a scale is not the frequency of the modulation, as such, but the length of the fixed light loop. This is to be understood in the sense that the length of the fixed light loop can, by way of example, be so selected that it corresponds exactly to a unit in a measuring system. Thus, the distance can be measured as a number of lengths of the fixed light loop 9.

While a specific embodiment of the invention has been shown and described in detail to illustrate the application of the principles of the invention, it will be understood that the invention may be embodied otherwise without departing from such principles.

What is claimed is:
1. An electro-optical distance measuring device comprising, in combination, a transmitter emitting modulated light and located at one end of the distance to be measured; a light reflector at the other end of the distance to be measured; a receiver at said one end of the distance to be measured operable to receive modulated light emitted from said transmitter along the measuring path and reflected from said reflector along the measuring path; phase measuring means operable to measure the phase difference between the modulation of the emitted light and the modulation of the received light; a fixed length light loop positioned in the ambient atmosphere; means operable to shunt emitted modulated light away from the measuring path and through said fixed length light loop to said receiver; and a variable frequency oscillator operable to tune the wave length of the modulation to the length of said light loop.

2. A device, as claimed in claim 1, in which said light shunting means includes a mirror selectively positionable in the path of emitted modulated light directed to said reflector to reflect the emitted modulated light through said fixed length light loop.

3. A device, as claimed in claim 1, in which said light shunting means includes a mirror selectively positionable in the path of emitted modulated light directed to said reflector to reflect the emitted modulated light through said fixed length light loop.

4. A device, as claimed in claim 1, in which said light shunting means comprises light divider means positioned along the measuring path and in operative relation with said fixed length light loop.

5. A device, as claimed in claim 1, including a second light loop in the measuring path between said reflector and said receiver; said second light loop including loop length adjusting means having a pointer associated with a scale.

References Cited

UNITED STATES PATENTS

| | | | |
|---|---|---|---|
| 2,966,824 | 1/1961 | Granquist | 356—5 |
| 3,249,937 | 5/1966 | As et al. | 343—14 |

RICHARD A. FARLEY, Primary Examiner

J. P. MORRIS, Assistant Examiner